United States Patent
Horovitz et al.

(10) Patent No.: US 8,606,000 B2
(45) Date of Patent: Dec. 10, 2013

(54) DEVICE AND METHOD FOR IDENTIFICATION OF OBJECTS USING MORPHOLOGICAL CODING

(75) Inventors: Ronen Horovitz, Haifa (IL); Ran Kaftory, Kiryat Tivon (IL)

(73) Assignee: Eyecue Vision Technologies Ltd., Yokneam (IL)

( * ) Notice: Subject to any disclaimer, the term of this patent is extended or adjusted under 35 U.S.C. 154(b) by 367 days.

(21) Appl. No.: 12/857,763

(22) Filed: Aug. 17, 2010

(65) Prior Publication Data

US 2010/0310161 A1  Dec. 9, 2010

Related U.S. Application Data

(63) Continuation-in-part of application No. 12/106,387, filed on Apr. 21, 2008, now Pat. No. 8,126,264, and a continuation-in-part of application No. 12/582,015, filed on Oct. 20, 2009, and a continuation-in-part of application No. 12/667,942, filed as application No. PCT/IL2008/000961 on Jul. 10, 2008.

(60) Provisional application No. 61/274,427, filed on Aug. 17, 2009, provisional application No. 60/907,853, filed on Apr. 19, 2007, provisional application No. 61/106,755, filed on Oct. 20, 2008, provisional application No. 60/929,713, filed on Jul. 10, 2007.

(51) Int. Cl.
| | |
|---|---|
| G06K 9/00 | (2006.01) |
| G06K 9/46 | (2006.01) |
| G06K 9/34 | (2006.01) |

(52) U.S. Cl.
USPC .......................................... 382/165; 382/195

(58) Field of Classification Search
USPC ............... 382/162, 164, 173, 181, 218–220
See application file for complete search history.

(56) References Cited

U.S. PATENT DOCUMENTS

| | | | |
|---|---|---|---|
| 4,514,622 A * | 4/1985 | Wevelsiep et al. | 382/181 |
| 7,515,734 B2 | 4/2009 | Horovitz et al. | |
| 8,126,264 B2 * | 2/2012 | Kaftory et al. | 382/165 |
| 2005/0240871 A1 | 10/2005 | Wilson | |
| 2008/0149713 A1 | 6/2008 | Brundage | |
| 2008/0260244 A1 | 10/2008 | Kaftory et al. | |
| 2009/0180669 A1 | 7/2009 | Horovitz et al. | |
| 2010/0099493 A1 | 4/2010 | Horovitz | |
| 2010/0151942 A1 | 6/2010 | Horovitz | |
| 2010/0173709 A1 | 7/2010 | Horovitz et al. | |
| 2010/0195902 A1 | 8/2010 | Horovitz | |

OTHER PUBLICATIONS

International Search Report of Application No. PCT/IL10/00668 mailed on Dec. 14, 2010.

* cited by examiner

*Primary Examiner* — Amir Alavi
(74) *Attorney, Agent, or Firm* — Pearl Cohen Zedek Latzer Baratz LLP

(57) ABSTRACT

A method and system for detecting in an image a repeating unit, where the unit includes a reference form and a set of elements at a known distance from and orientation to the reference form, deriving a value from the elements included in the unit, and comparing the derived value to a know value. The elements may indicate binary values that may be used in the derivation of the value, and the value may be associated with an object. The comparison of the value derived from the elements in the image with the stored value that is associated with the object may be used in identifying or confirming the identification of the object in the image.

15 Claims, 2 Drawing Sheets

DEVICE AND METHOD FOR IDENTIFICATION OF OBJECTS USING MORPHOLOGICAL CODING

CROSS REFERENCE TO RELATED APPLICATIONS

This application claims the benefit of U.S. Provisional Application No. 61/274,427, filed on Aug. 17, 2009 entitled MONOCHROMATIC CODE TO BE READ FROM A CAMERA, and is a Continuation in Part of (i) U.S. application Ser. No. 12/106,387 filed on Apr. 21, 2008 now U.S. Pat. No. 8,126,264 entitled DEVICE AND METHOD FOR IDENTIFICATION OF OBJECTS USING COLOR CODING which claims benefit from U.S. Provisional Application No. 60/907,853, filed on Apr. 19, 2007 entitled ALGORITHM AND METHOD FOR IDENTIFICATION OF OBJECTS USING COLOR CODING AND A CAMERA, (ii) U.S. application Ser. No. 12/582,015 filed on Oct. 20, 2009 entitled SYSTEM AND METHOD FOR INTERACTIVE GAMES AND TOYS BASED ON RECOGNITION AND TRACKING OF PRE-PROGRAMMED ACCESSORIES, which claims priority from U.S. Provisional Application No. 61/106,755, filed on Oct. 20, 2008 entitled SYSTEM AND METHOD FOR INTERACTIVE GAMES AND TOYS ON EMBEDDED SYSTEMS, and (iii) U.S. application Ser. No. 12/667,942 filed on Jan. 6, 2010 entitled SYSTEM AND METHOD FOR CALIBRATION OF IMAGE COLORS, which is a U.S. national phase application of PCT International Patent Application No. PCT/IL2008/000961 filed on Jul. 10, 2008, which claims benefit from U.S Provisional Application No. 60/929,713 filed on Jul. 10, 2007 entitled SYSTEM AND METHOD FOR HIGHLY ROBUST INTERACTIVE VIDEO CALIBRATION, all of which are incorporated herein in their entirety.

FIELD OF THE INVENTION

This application relates to computer vision, and particularly to identifying an object in an image captured in uncontrolled lighting conditions, where the identification is based on repeating units of morphological code that appear on the object.

BACKGROUND OF THE INVENTION

Identification of objects in an image captured by a digital imaging device may rely on extracting features of the object and use pattern recognition of those features to identify the object. Pattern recognition and feature extraction may be subject to inaccuracies caused by, among other things, lighting conditions, changes in object orientation, relative distance of the object from the imager and occlusion. Typical identification processes may therefore entail rotation, translation and scale invariant features, and may call for complicated pattern recognition algorithms. Adding an object to the recognition task may therefore require adjusting a recognition algorithm compensation for lighting condition.

SUMMARY OF THE INVENTION

An embodiment of the invention may include a method of identifying an object by capturing an image of the object, where in the image is detected a repeating reference form and a set of elements that are at a pre-defined distance from and orientation to the repeating reference form. A value may be derived from the set of elements, and that value may be compared to a stored value that is associated with the object. The derived and detected value of the elements in the image may confirm the object in the image as matching the object having the associated value stored in the memory. Instance of the repeating units may appear on a perimeter of an object or elsewhere, and the repetition of the units may compensate for occlusion of some of the units or a failure of the imager to clearly capture one or more of the units or elements. In some embodiments, a derived value of an element may be determined on the basis of its length relative to the alignment bar, such as a length along a perimeter of the alignment bar, or by a perpendicular height of an element to the alignment bar, such as a distance of an end of the element from its base as is connected to the alignment bar. For example, an element representing a "0" may be an absence of an element along a spot on an inner edge of an alignment bar. A "1" may represent the presence of an element along a position on an inner edge of an alignment bar. Values may also be derived from other heights, thicknesses, shapes or sizes of elements relative to each other or to the alignment bar.

In some embodiments, the elements may be connected to and may follow a curve of the alignment bar or reference form, and may be of a same or designated color or groups of colors relative to the reference form In some embodiments, a value may be derived from more than one set of elements detected in the image, and the values may be compared for purposes of confirming the accuracy of the detected image and computation of the value.

In some embodiments, if the values of two sets of elements detected in the image are not equal, a value may be derived from a third set of elements and compared to the other two values. If derivations for two out of three, or some other proportion, of elements yield the same value, such value may be assumed to be the value appearing in the image. Further derivations of sets of elements may be undertaken to add robustness to the identification.

In some embodiments, a unit may be detected on the basis of it including a reference form such as an alignment bar and elements connected to, or at a known orientation to, the reference form.

In some embodiments, a processor may issue a signal upon the confirmation of identification of an object in the image. In some embodiments, an imager may capture and detect a unit and a set of elements at a distance of up to 5 meters.

Some embodiments of the invention may include a system of an object having appearing thereon repeating reference forms and a set of elements at a pre-defined orientation and distance from the repeating reference form, and a processor to calculate a value associated with the elements and to compare the value to a value stored in a memory.

Some embodiments may include a medium to store a set of instructions that may be executed by a processor, where, upon such execution, the processor translates a numeric value into a set of non-numeric binary shapes and creates an insert item to a print file that includes the shapes oriented to a known position relative to a reference form. The item may be added to a print file in repeating units around for example a perimeter of an image of the object that is to be printed. The repeating unit may appear in the printed image at a known position relative to the image of the printed object. In some embodiments, the repeating units may be configured or added to the print file to conform to a shape of the printed object. For example, if the object being printed is a round face, the repeating units may form a round frame around the printed face. The repeating units may be added to the print file so that they appear at least at a minimum distance from the object being printed, such that the elements do not overlap or touch the printed image.

In some embodiments, the instructions may associate the printed object with the value that was translated into the elements. For example, a processor may generate a set of shapes on an alignment bar that have a value of 23, and add repeating units of the shape around a printed round face. The printed round face may be associated in a memory with the value 23 so that, upon a later detection of shapes that yield a value of 23, the processor may signal a detection of the round face.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "evaluating," "processing," "computing," "calculating," "associating," "determining," "designating," "allocating" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored as instructions on an article such as a memory device, where such instructions upon execution by a processor result in a method of an embodiment of the invention.

As used in this application, the term 'morphological' may, in addition to its regular meaning, imply that a first shape emerges from a second shape. For example, a shape in an image that may indicate a bit of information may be attached to, continue, emerge or morph from an alignment bar, such that the detection of the shape representing the bit may be associated with or related to the detection of the shape or presence of the alignment bar.

Figure 1:
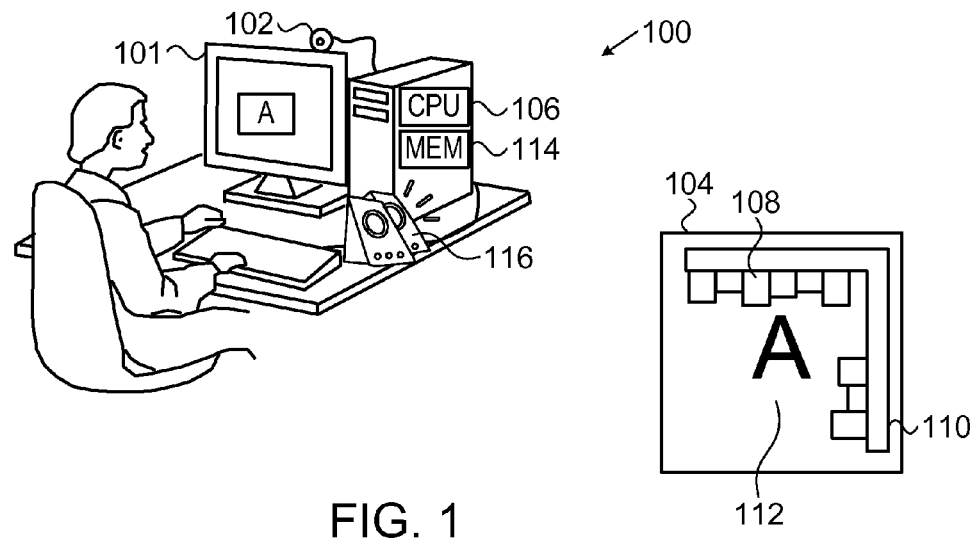
FIG. 1 is a schematic diagram of a system including an imaging device, a processor, and an object to be identified in accordance with an embodiment of the invention.

FIG. 1 is a schematic diagram of a system including an imaging device, a processor, and an object to be identified in accordance with an embodiment of the invention. In some embodiments, a system 100 may include for example a screen or display 101 that may be connected to or associated with a processor 106, and an imager 102 that may capture an image of an object 104, and relay or transmit digital information about the image to processor 106. Object 104 may include or have printed or placed thereon various shapes 108 that may be arranged for example in a known or pre-defined pattern, on an area of object 104, such as a rim or perimeter 110 of object 104 or on other known areas of object 104, such that such shapes 108 are visible to imager 102. In some embodiments, such shapes may be or include monochromatic morphological shapes. In some embodiments, on a middle or other part of object 104, there may be affixed, attached or printed a mark, such as a shape, number, letter, drawing or other figure 112 to be identified. A list of patterns of shapes 108 may be associated with one or more objects 104 or figures 112 that may be attached to object 104, and such lists and associations may be stored in a memory 114 that may be connected to processor 106.

In operation, display 101 may show or display figure 112, such as a letter A, to for example, a user. User may then find an object that matches or otherwise corresponds to the displayed figure 112, such as a card or other object that may have a letter A printed on or attached to it. User may raise or otherwise expose the object 104 to imager 102, which may capture an image of the object 104 and of the shapes 108 that may be printed on, attached to or otherwise make up a part of object 104. The image may be transmitted to processor 106 which may find or discern the pattern of the monochromatic morphological shapes 108 on the object 104 in the image. Processor 106 may search memory 114 for a numerical or other value of the identified pattern of shapes 108, and may determine that the particular pattern of shapes 108 that appeared on the object 104 in the image is associated with a value that may have been assigned to figure 112 that was shown on display 101. Upon a detected match between the displayed figure 112 and the object 104 that was exposed to the imager, processor 106 may issue a signal to for example to an audio, visual or other indicator or calculator, such as a bell or speaker 116, to indicate that the figure on object 104 that was captured in the image corresponds to the figure shown on display 101. For example, a letter A may be associated with a value 23 as such value and association may be stored in memory 114. A card having a letter A as a figure 112, may include a shape 108 pattern that is also is associated in memory 114 with a value 23. Processor 106 that signaled display 101 to show an A to a user, may detect a match between the value associated with the displayed figure 112 and the value indicated by the pattern of shape 108.

In some embodiments, a pattern of shape 108 may be identified even if the image is captured in an uncontrolled environment, such as for example against a non-uniform background such as a colored wall or curtain, and under uncontrolled lighting and shadow conditions, such as direct or indirect light, sunlight, indoor ambient light or other non-uniform lighting conditions.

In some embodiments, a pattern of shapes 108 may be identified even if an orientation of object 104 relative to imager 102 is other than perpendicular to the light entering or reflecting back to imager 102. For example, object 104 may be held at an acute or other angle to imager 102, may be rotated, partially occluded by for example interfering objects such as a hand of a user, or otherwise incompletely imaged, and imager 102 may still be able to detect and identify at least one or a part of the repetitive pattern of shapes 108.

In some embodiments, a pattern of shapes 108 may be identified at various distances of object 104 from imager 102, such as for example from 10 cm to up to 5 meters or more. In some embodiments, the distance from imager 102 at which a pattern of shapes 108 of object 104 may be identified may be dependent on for example a resolution of imager 102 and may allow the determination of the distance of the object 104 from the imager 102. For example, processor 106 may determine a size of a first shape 108 and a size of a second shape 108 in the image on the basis of the number of pixels in the captured image that include the first shape 108 and the second shape.

In some embodiments, imager 102 may be or include a suitable digital imager such as a CCD, CMOS or other video or still digital image capture device capable of capturing and transmitting color or intensity image data. In some embodiments, a low resolution camera, such as those typically included in a web-cam or network capable camera configuration, having a resolution of QVGA or VGA may be suitable for an embodiment of the invention.

In some embodiments, processor 106 may be or include an embedded processor or a DSP or a Pentium® IV or higher processor or other comparable processor typically used in a home computing configuration. Memory 114 may be or may be included in any suitable data storage device such as a hard drive, flash, or other electronic data storage on which may be stored for example a data base, array, tree or other data storage structure. In some embodiments, display 101 and bell or speaker 116 may be or be included in a single device such as for example a display and sound system that may indicate to a user that a match or other action is correct, incorrect or otherwise responsive to a question, challenge or other signal posed to the user.

In some embodiments, processor 106 may be an embedded processor which is housed inside an object such as a mobile phone, toy, doll or toy housing. In some embodiments, imager 102 and bell/speaker 116 may be or be included inside the doll or toy or toy housing.

Figure 2A:
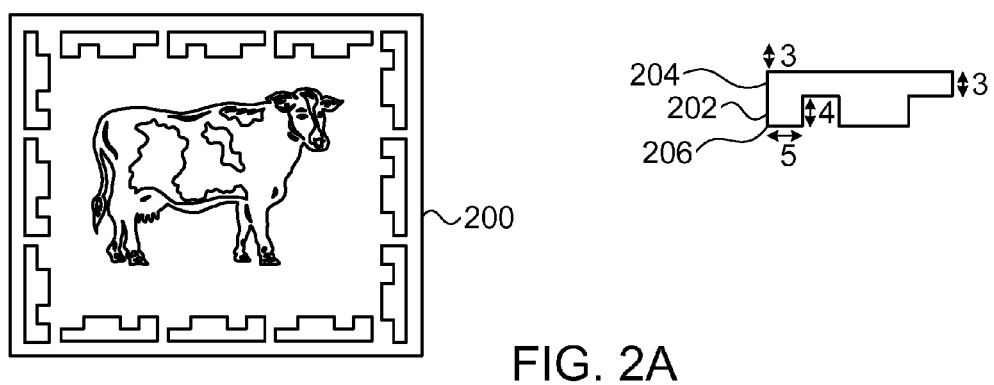
FIGS. 2A and 2B are examples of objects that may be identified in accordance with an embodiment of the invention.
Figure 2B:
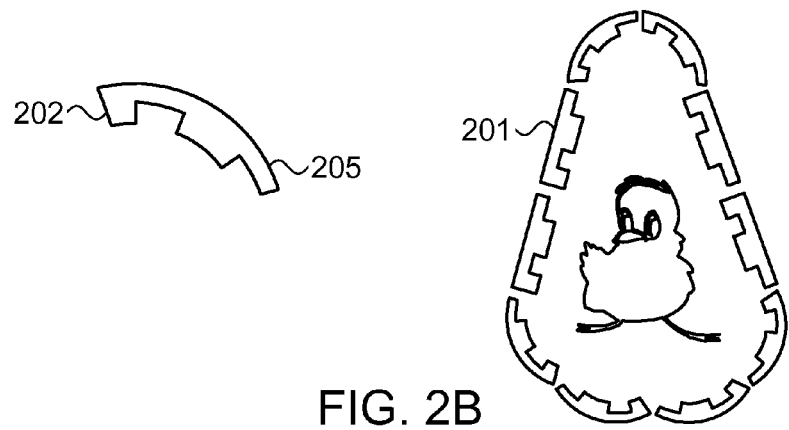

FIGS. 2A and 2B are examples of objects that may be identified in accordance with an embodiment of the invention, and expanded views of the repeating codes and alignment bars on a perimeter of such objects. In some embodiments, objects 200 and 201 may be or include a flat, spherical, cubical or other shaped object that may be suitable to be moved, raised or otherwise maneuvered by for example a user or some other system to be brought into an area to be imaged by imager 102. In some embodiments, objects 200 and 201 may be a card or disc that may be or include cardboard, plastic or other semi-rigid material. Objects 200 and 201 may include a ball, toy, manufactured device or other item as long as the monochromatic morphological shape pattern can be printed, attached, stamped on or stuck to it.

Attached or imprinted on for example an outside perimeter of object 200 may be a series of shape code 202 that may create a pattern of for example repeating or repetitive monochromatic binary codes. Monochromatic morphological shape codes 202 may consist of a reference form such as an alignment bar 204 or alignment curve (shown by horizontal lines for visualization purposes in FIG. 2) and data bits 206 (shown by diagonal lines for visualization purposes in FIG. 2). As shown in FIG. 2B, alignment bar 205 may be curved or may assume some other shape or geometrical form. In some embodiments, code 202 may be binary and may be read from right to left, or otherwise in accordance to the position of alignment bar 204. A dark bit may be read as "1" while a light bit may be read as "0". Alignment bar 204 and data bits 206 may be colored with any color which may provide contrast to the background color of object 200. The proportions of the code 202 elements are depicted in the expanded views of codes and alignment bars in FIGS. 2A and 2B. Other proportions and dimensions are possible. In some embodiments, a maximum distance from which this code is recognized by an imager may depend on the code 202 units being detected by even a single pixel in the image.

In some embodiments, code 202 may be depicted along a curved plane of bar 205 as the proportions of the sides of bits 206 of code 202 are maintained relative to each other and to bar 5.

Shapes 202 may form any geometrical shape (e.g., lines, circles etc.) or may take on other configurations. The pattern of code 202 may be marked on object 200 on one, some or all sides exposed to the imager. Object 200 may include any tactile object to which code 202 may be affixed or on which code 202 may be shown.

Sequences of monochromatic morphological shape codes 202 may include at least two binary bits, though the variations of codes and hence the number of items or figures 206 associated with a distinct pattern of monochromatic morphological shape code 202 may increase with increased number of bits 206 included in the monochromatic morphological shapes 202. The size of each monochromatic morphological shape 202 may be determined by, for example, the intended distance between object 200 and imager 102 as well as by the resolution of imager 102.

Localization of the monochromatic morphological shapes 202 around a perimeter, rim, edge or other pre-defined area of object 200 may avoid the effects of occlusion of a portion of code 202, and may provide more robust detection and identification of code 202 once the object 200 is detected in an image. Similarly, repetition of the pattern may allow identification of the pattern even when the object is partially occluded or when an orientation of object 200 in an image partially blocks its exposure to the imager 102.

A particular monochromatic morphological shape code 202, such as for example binary code 10101, may be pre-defined and stored in memory 114, where the pattern may be associated with a value that may be further associated with an object or figure. In some embodiments, a monochromatic code may designate a binary code in a pattern, in which case the number of combinations may be defined as $$2^n - 2$$

where n is the number of bits in the code and a code of all zeros or all ones is forbidden. For example, if five bits are used, there may be $2^5 - 2 = 30$ combinations. In some embodiments, an additional feature may be used to increase the number of possible codes such as the color of the monochromatic code. Polychromatic combinations or codes may be possible, such that if r different colors are used, the formula becomes:

$$(2^n - 2) * r$$

In the given example, if we use 6 different colors, then 180 combinations may be possible.

In some embodiments, even more features may be used to increase the number of possible codes such as the color of the background of the monochromatic code. If r different colors are used and k different background colors are used, then the formula becomes:

$$(2^n-2)*r*k$$

In the given example, if we use 6 different background colors as well, then we come up to 1080 combinations.

To further enlarge the number of possible codes without using more colors, a two sided binary coding scheme may be used, whereas for the same width and an increase in the height of the code may be used, so long as such increase in height is distinguishable by the imager. Such varying heights may increase the possible combinations exponentially. This allows for example, $2^5*2^5=2^{10}-4=1020$ combinations.

Detection and identification of a bar or code in a captured image may entail some or all of the following processes.

Extraction of edges captured in an image, where such extraction is performed by a suitable edge extraction method, such as for example non-maximal suppression as may be implemented in the Canny operator for edge extraction.

Identification of captured edges that form closed contours, where such identification may be performed using a connected component algorithm such as a regular labeling operation. Such identification may detect the presence of edge contours which comply with the pre-defined ratios of the alignment bar, code or object to one or more of each other.

Extraction of the corners of the identified closed contours, by way of for example a corner detector such as calculation of the curvature of some or all of the pixels that are part of the closed edge contours.

Calculation of the maximum distance, on one or more contours, between two adjacent corners, so as to identify for example the alignment bar length.

Calculation of the number of pixels that are contained in one or more bits by dividing the length of the alignment bar by the number of bits forming the code.

Reading the intensity of one or more bits from the image by for example checking the value of a pixel in the middle or in another area of such bit.

Comparing an intensity of a bit to the intensity outside the closed contour and inside it, such that if the intensity of a bit is closer to the intensity outside the closed contour it may be identified as "0", whereas otherwise it may be identified as "1".

Determining the apparent code by identifying the code with the maximum repetitions from the various possible codes that were extracted from the image.

In some embodiments, a length of the alignment bar may be used to measure to the absolute distance from the imager of the object containing the code, where for example the real world size of the printed code is known a priory.

In some embodiments, the shape, alignment bars and codes may be repetitive, so it is likely that more than one sequence of the pattern appears in the image. A probability function for the pattern may be used to verify the object classification by taking into account, not only the presence of a code or pattern and the number of times it appears, but also the number of adjacent sequences or other spatial based relation between such repetitions such as distance or dispersion. The pattern with the highest probability may be chosen as representing the pattern associated with the correct code and the associated object. In some embodiments, this procedure may be applied in consecutive frames of an image and the confidence of classification may be increased if a same pattern is selected on a few or consecutive frames.

In some embodiments, shape patterns may be attached to objects such as empty cards with no figure on them, and the user may adhere an image or draw an image on the blank cards. For example, a pattern associated in memory with "My Pet", may be attached to a picture of a user's pet, and the blank card may be recognized by the system as being associated with the pet.

In some embodiments, patterns of shapes may be camouflaged or even non-discernible to the human eye, as they may be implanted within a picture or item that is observed by the imager in a way which is integrated into the printed figure itself. For example, a letter, number or figure may be drawn to include a shaped pattern that may be identified by the imager but hidden from obvious discernment by a user. For example, shape patterns within a picture or on an item may be printed using an ink that is not reflective in the visible light spectrum such as IR or near IR, and the imager that captures the image may be an IR camera. In some embodiments, a micro-code version of shapes and codes may be affixed to an object to create a more camouflaged version of coded objects.

In some embodiments, detection of a shape that includes a code may include subtraction process to isolate objects in a second image that was not included in a first or prior image on the assumption that the object that includes the shape was introduced into the view of the imager subsequent to the capture of the first image. Such subtraction may reduce the number of attempts or calculations required to detect the object in a series of images.

In some embodiments, the recognition of the coded objects may be used as part of an educational curriculum for children or students. The recognition of coded objects may be associated with answers to questions, for example, upon an instruction to "Hold up an animal card!", the student holds up an animal card coded with the monochromatic shapes that are associated with cards showing pictures or names of animals. The system may detect the codes and recognize the code number and respond with "That's a bear!" This process may be expanded to a classroom equipped with a computer and one or more imagers where the computer recognizes different objects or cards for a full class experience with multiple students, one or more of whom may hold up a correct or incorrect card or object.

In some embodiments, recognition of the objects having shapes and codes may be used as part of an interaction with a customer. For example: a customer waiting in a restaurant who wants to get the attention of a waiter may hold up a coded image or other coded object, and a camera in the restaurant may detect the coded image and send the location of the table along with the code number, which can be associated with "Please bring me the check" or other message.

In some embodiments, detection or identification of a particular code may elicit a computerized or automated response, by for example a mobile phone whose camera may detect a presence of a shape or code and display on the phone's screen an animation sequence related to that object associated with the code, or dial a number related to the object.

In another embodiment, coded patches, images or even shirts can be used to track the location of people or animals in a farm. Different locations in the surroundings may have cameras connected to a computer which recognizes the people or animals when they cross a field of view of a camera.

In another embodiment, coded objects or cards can be used to navigate to different websites by showing the coded objects or cards to a webcam associated with a computer, for example, showing a coded car from the movie "Transformers™" may send the browser in a computer to the relevant Transformers™ website or showing a coded image of a Barbie™ doll may direct the browser to the Barbie™ website.

Figure 3:
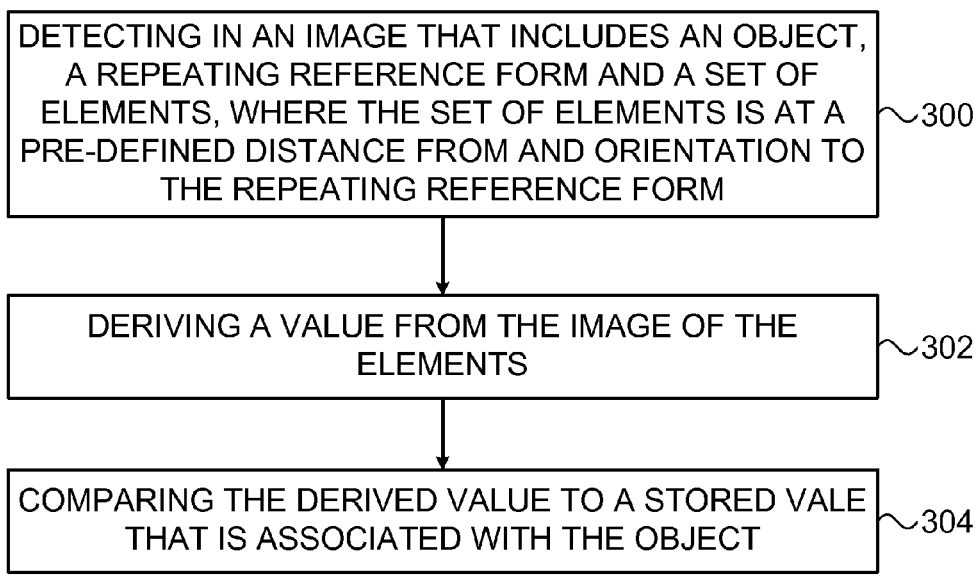
FIG. 3 is a flow diagram of a method in accordance with an embodiment of the invention.

Reference is made to FIG. 3, a flow chart of a method in accordance with an embodiment of the invention. Some embodiments may include a method of identifying an object, where such method includes, as in block 300, detecting in an image a repeating reference form and a set of elements, where the set of elements is at a pre-defined distance from and orientation to the repeating reference form. For example, a reference form may be a curved or straight alignment bar, and the elements may jut out from the alignment bar at for example a perpendicular angle. In block 302, a value may be derived from the image of the elements. In block 304, the derived value may be compared to a value stored in a memory, where the stored value is associated with the object.

In some embodiments, an image of the object may be captured at a distance from the imager from a distance of up to 5 meters.

In some embodiments, the detecting may include detecting elements that are connected to the alignment bar, and where deriving a value includes deriving a first value from a first set of elements and a second value from a second set of elements, and comparing the values to determine if they are the same. If the values are not the same, in some embodiments a third value may be selected from a third set of elements and a comparison of the third value to each of the first and second values may be made. A value that is derived from two or more of the sets may be assumed to be the true value.

In some embodiments, the elements may be recognized as elements only if they are connected or at a defined distance or orientation from the alignment bar or reference form.

In some embodiments, if the value derived from the elements matches a value stored or designated from a memory, then a signal may be issued indicating such match to the user.

In some embodiments, the nature or meaning of an element may be derived from a size or length of the element of from a distance of the element from the reference or alignment bar. In some embodiments, a single element of the set of elements may represent either a zero or a 1. In some embodiments, the elements may have different colors and may be differentiated by such colors.

In some embodiments, a series of instructions in the form of, for example, software may be stored in an electronic storage medium and executed by a processor to translate a numeric value into a set of non-numeric binary shapes such as those that may extend from an alignment bar. The processor may orient the shapes at a known to position relative to the alignment bar, such as connecting at a perpendicular angle to the bar, and add repeating units of alignment bars and the set of shapes to a print file that includes an image around which are to appear the repeating units. When an image of the object is printed, the repeating units may appear around or on a side or elsewhere on the printed image. The shape of the printed repeating units may conform to an outline of the printed image and may be printed at a given or minimum distance from an edge of the printed image.

In some embodiments, the instructions may store the value represented by the elements along with an association of such value with the printed object.

It will be appreciated by persons skilled in the art that embodiments of the invention are not limited by what has been particularly shown and described hereinabove. Rather, the scope of at least one embodiment of the invention is defined by the claims below.

The invention claimed is:

1. A method of identifying an object, comprising:
   detecting in an image repeating reference forms and a set of elements, said set of elements at a pre-defined distance from and orientation to said repeating reference forms; wherein upon occlusion of at least a part of a first of said repeating reference forms and set of elements, said detecting comprises detecting in said image a second of said repeating reference forms and set of elements;
   deriving a value associated with said second set of elements; and
   comparing said value to a value stored in a memory, where said value stored in said memory is associated with said object.

2. The method as in claim 1, wherein
   said detecting comprises detecting a set of said elements connected to said second detected repeating reference forms, and
   said deriving said value comprises deriving a first value from said second set of elements,
   and the method further comprising:
   deriving a second value from a third set of elements; and
   determining if said first value is equal to said second value.

3. The method as in claim 2, further comprising deriving a third value from a fourth set of said repeating elements, and determining if said third value is equals to either of said first value or said second value.

4. The method as in claim 1, wherein said detecting comprises detecting that said second set of elements is connected to said second reference form.

5. The method of claim 1, further comprising determining an orientation of one of said set of elements relative to one of said repeating reference forms.

6. The method as in claim 1, further comprising issuing a signal that said object is associated with said value.

7. The method as in claim 1, further comprising capturing an image of said object at a distance from an imager of up to 5 meters.

8. The method as in claim 1, further comprising:
   identifying a first of said elements and a second of said elements; and
   differentiating said first element from said second element on the basis of a size of each of said elements relative to said reference form.

9. The method as in claim 8, wherein said identifying comprises identifying said first element as either a 0 or a 1.

10. The method as in claim 1, further comprising:
    identifying a first of said elements and a second of said elements; and
    differentiating said first of said elements from said second of said elements on the basis of a color of said first element and a color of said second element.

11. A system for identifying an object comprising:
    an object having appearing thereon repeating reference forms and a set of elements, said set of elements at a pre-defined orientation and distance from one of said repeating reference forms;
    an imager adapted to capture an image of at least one of said repeating reference forms and said set of elements; and
    a processor adapted to detect in said image said repeating reference forms and said set of elements, wherein upon occlusion of at least a part of a first of said repeating reference forms and set of elements, said processor is adapted to detect in said image a second of said repeating reference forms and set of elements and calculate a value associated with said set of elements and to compare said value to a value stored in a memory.

12. The system as in claim 11, wherein said processor is to detect a set of elements associated with a first instance of said repeating reference forms and a set of elements associated with a second instance of said repeating reference forms;

calculate a first value from said first set of elements, and a second value from said second set of elements; and determine if said first value is equal to said second value.

13. The system as in claim 12, wherein said processor is to derive a third value from a third set of said elements, and determine if said third value is equal to either of said first value and said second value.

14. The system as in claim 11, wherein said processor is to detect that said set of elements is connected to one of said repeating reference forms.

15. The system as in claim 11, wherein said processor is to determine an orientation of said set of elements relative to one of said repeating reference forms.

* * * * *